(12) United States Patent
Kim

(10) Patent No.: US 7,771,868 B2
(45) Date of Patent: Aug. 10, 2010

(54) BATTERY PACK

(75) Inventor: Paul Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 905 days.

(21) Appl. No.: 11/591,999

(22) Filed: Nov. 1, 2006

(65) Prior Publication Data

US 2007/0111088 A1 May 17, 2007

(30) Foreign Application Priority Data

Nov. 2, 2005 (KR) .................. 10-2005-0104572

(51) Int. Cl.
*H01M 2/24* (2006.01)
(52) U.S. Cl. ........................... 429/158; 429/160
(58) Field of Classification Search ............... 429/157, 429/158, 160, 161
See application file for complete search history.

(56) References Cited

U.S. PATENT DOCUMENTS

2005/0031945 A1* 2/2005 Morita et al. ............... 429/158

* cited by examiner

*Primary Examiner*—Dah-Wei D Yuan
*Assistant Examiner*—Stephan Essex
(74) *Attorney, Agent, or Firm*—Christie, Parker & Hale, LLP

(57) ABSTRACT

A battery pack includes a plurality of cylinder-type battery cells, each cylinder-type battery cell including a first end and a second end having different polarities. The battery pack also includes a conductive plate having a bendable portion located between a first half portion and a second half portion. The first half portion is fixedly connected to the first end of at least a first cylinder-type battery cell and the second half portion is fixedly connected to the second end of at least a second battery cell so that the conductive plate connects at least two cylinder-type battery cells in series. A width of the bendable portion is narrower than a width of the rest of the conductive plate and the conductive plate is in a bent configuration bent about the bendable portion such that the first half portion and the second half portion are aligned.

16 Claims, 5 Drawing Sheets

BATTERY PACK

CROSS REFERENCE TO RELATED APPLICATION

This application claims priority to and the benefit of Korean Patent Application No. 10-2005-0104572, filed on Nov. 2, 2005, in the Korean Intellectual Property Office, the entire disclosure which is incorporated herein by reference.

BACKGROUND OF THE INVENTION

1. Field of the Invention

The present invention relates to a battery pack and more particularly to a battery pack having an improved short circuit prevention mechanism.

2. Description of the Related Art

In general, a single battery cell may be insufficient as a power source for a notebook PC, etc. Therefore, a battery pack is provided as a power source, the battery pack including a plurality of battery cells connected in a row and/or in series, the battery pack providing a desired voltage and capacity. A conductive plate is generally used for connecting a plurality of battery cells in a row and/or in series. A charge/discharge control circuit and/or a protective circuit may be installed in the battery cells, such battery cells being accommodated in a case with various circuits.

Referring to FIG. 1a, a first conductive plate 21 is fixed to battery cells 1, 2, a second conductive plate 22 is fixed to battery cells 1, 2, 3, 4, a third conductive plate 23 is fixed to battery cells 3, 4, 5, 6 a fourth conductive plate 24 is fixed to battery cells 5, 6, 7, 8, and a fifth conductive plate 25 is fixed to battery cells 7, 8 by welding, the sides of individual battery cells having different polarities. A protruding terminal of each battery cell represents a positive electrode and a flat terminal of each battery cell represents a negative electrode.

Conductive plates 22, 23, 24 have generally centrally located bendable portions. A first portion of the conductive plates 22, 23, 24 located on a first side of the bendable portion is fixedly connected to a positive electrode and a second portion of the conductive plates 22, 23, 24 located on a second side of the bendable portion is fixedly connected to the negative electrode such that the battery cells can be connected with each other in series or in a row. The conductive plates 21 and 25 electrically connect battery cells having the same polarities in a row.

FIG. 1b shows the battery cells when the conductive plates 22, 23, 24 have been bent about the bendable portions thereof. In FIG. 1b, B+ and B− represent current terminals, i.e., power source sections provided at either side end of the battery cells connected in series or in a row. Here, B+ is a positive electrode power source section serving as the highest potential terminal, and B− is a negative electrode power source section serving as the lowest potential terminal. A power source terminal tap may be connected to the current terminals to supply power. The conductive plate may be fabricated with a shape of a "T" or "⊥", wherein a horizontal part "—" is fixed to the positive electrode or the negative electrode by welding, and a vertical part "I" is fixed to the power source terminal tap by soldering. The conductive plate may be integrally formed with the power source terminal tap.

In addition, B1, B2 and B3 represent sensing terminals, where electrodes of battery cells having different polarities are connected in series. The sensing terminals B1, B2, B3 refer to intermediate potential terminals aligned between the highest potential terminal B+ and the lowest potential terminal B−. A sensing terminal tap may be connected to the sensing terminals B1, B2, B3 to detect voltage. The conductive plate may be fabricated with a shape of a "T" or "⊥", wherein a horizontal part "—" is fixed to the positive electrode or the negative electrode by welding, and a vertical part "I" is fixed to the sensing terminal tap by soldering. The conductive plate may be integrally formed with the sensing terminal tap.

The power source terminal tap and the sensing terminal tap may both be described as "terminal taps." The terminal taps may be fabricated in the form of a wire or an elongated plate and may be made from nickel-containing metal.

The sensing terminal tap is not shown in FIG. 1b. A power terminal tap 31 extending from the conductive plate 21 provided at the B− terminal is connected to a circuit section of a printed circuit board (PCB) along surfaces of battery cells 1, 2 connected in series. In addition, a power terminal tap 32 extending from the conductive plate 25 provided at the B+ terminal is connected to the circuit section of the PCB.

Referring to FIG. 1c, the conductive plate 23 has a generally rectangular shape and has a generally centrally-located bendable portion 23d. A first-half part 23b of the conductive plate 23 may be welded to a top surface of the battery cell having positive polarity and a second-half part 23a of the conductive plate 23 may be welded to a bottom surface of the battery cell having negative polarity. In addition, the conductive plate 23 may include a terminal tap connection part 23c to which the terminal tap is connected. The terminal tap connection part 23c may be integrally formed with the first-half part 23b or the second-half part 23a of the conductive plate 23.

Referring to FIGS. 1b to 1d, the bendable portion 23d of the conductive plate 23 protrudes between battery cells 4, 6 at the sensing terminal B2. In addition, the power source terminal tap 31 extends in the vicinity of the bendable portion 23d. Accordingly, it is desirable to provide a device for preventing a short circuit from occurring between the bendable portion 23d and the power source terminal tap 31. Insulating tape 42 (FIG. 1b) may be attached onto transparent tape 43 used for fixing the battery cells 4, 6, and the power source terminal tap 31 may be surrounded by an insulating cover 41.

Although this structure can insulate between the bending portion 23d and the terminal tap (power source terminal tap 31) extending adjacent to the bending portion, a space formed between a case 70 (FIG. 1d) of the battery pack and the battery cell 6 is reduced as the size of the battery pack is minimized. In addition, since ends of the bending portion 23d may have sharp edges, various insulating members 41, 42 may be damaged by the side ends of the bending portion 23d when a device equipped with the battery pack vibrates. In this case, a short circuit may occur between the bending portion 23d of the conductive plate and the terminal tap 31, degrading the function of the battery pack.

Although bendable portions of the conductive plates 22, 24 also protrude between battery cells at the sensing terminals B1 and B3, since the terminal tap does not extend adjacent to the bending portions of the conductive plates 22, 24, a short circuit is less likely to occur between the bendable portions and the terminal tap.

SUMMARY OF THE INVENTION

A battery pack is provided including a plurality of cylinder-type battery cells, each cylinder-type battery cell including a first end and a second end having different polarities. The battery pack also includes an elongated conductive plate including a bendable portion located between a first half portion and a second half portion. The first half portion is fixedly connected to the first end of at least a first cylinder-type battery cell and the second half portion is fixedly connected to the second end of at least a second battery cell so that the elongated conductive plate connects at least two cylinder-type battery cells in series. Additionally, a width of the bendable portion is narrower than a width of the rest of the conductive plate. The conductive plate is in a bent configuration bent about the bendable portion such that the first half portion and the second half portion are aligned.

In another exemplary embodiment, a conductive plate for a battery pack is provided, the conductive plate including a bendable portion located between a first half portion and a second half portion. The first half portion is fixedly connectable to the first end of at least one cylinder-type battery cell and the second half portion is fixedly connectable to the second end of at least one other battery cell so that the conductive plate connects at least two cylinder-type battery cells in series. The conductive plate has an elongated configuration wherein at least a part of the bendable portion includes a recessed portion having a width narrower than a width of the rest of the conductive plate. The conductive plate has a bent configuration where the conductive plate is bent about the bendable portion at the recessed portion such that the first half portion and the second half portion are aligned.

DETAILED DESCRIPTION

Figure 2:
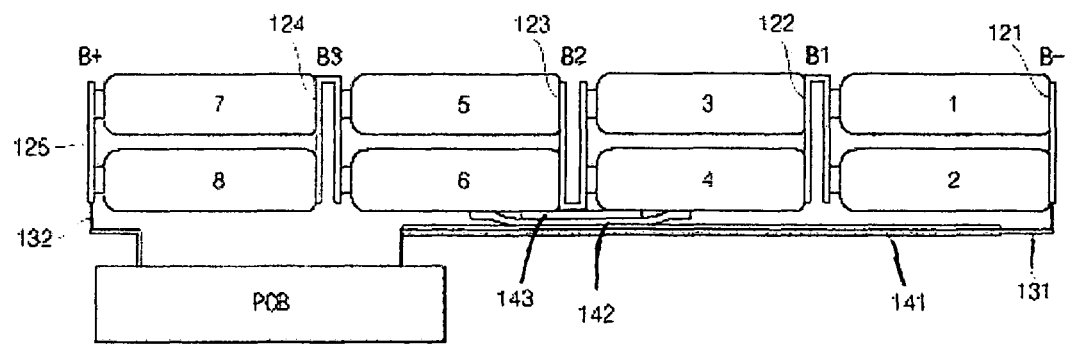
FIG. 2 is a schematic view illustrating the structure of a battery pack according to an exemplary embodiment of the present invention.

Referring to FIG. 2, the battery pack according to an embodiment of the present invention includes eight cylinder-type battery cells 1, 2, 3, 4, 5, 6, 7, 8, conductive plates 121, 122, 123, 124, 125 for connecting the battery cells in series and/or in a row, and terminal taps 131, 132. In addition, the battery pack may also include a PCB and a case for accommodating the above elements. The conductive plates may be integrally formed with the conductive terminal taps.

Each cylinder-type battery cell 1, 2, 3, 4, 5, 6, 7, 8 has top and bottom surfaces having different polarities. The top surface of the battery cell may be electrically connected to a positive electrode of an electrode assembly provided in the battery cell and the bottom surface of the battery cell may be electrically connected to a negative electrode of the electrode assembly provided in the battery cell. A secondary battery capable of performing charging/discharging operations may be used as the battery cell. In particular, a cylinder-type lithium secondary battery may be used because it has an operation voltage of about 3.6V and a higher energy density per unit weight than a conventional secondary battery.

The conductive plates 122, 123, 124 have generally centrally-located bendable portions. A first portion of the conductive plates 122, 123, 124 located one a first side of the bendable portion is fixed to the top surface of two battery cells, and a second portion of the conductive plates 122, 123, 124 located on a second side of the bendable is fixed to the bottom surface of two other battery cells so that four battery cells are connected by each conductive plate 122, 123, 124. Conductive plate 121 is fixed to the bottom surface of battery cells 1, 2 to electrically connect the battery cells 1, 2, and conductive plate 125 is fixed to the top surface of battery cells 7, 8 to electrically connect the battery cells 7, 8.

Although FIG. 2 shows that two battery cells are connected to each other in a row at each bank by conductive plates 121, 122, 123, 124, 125, the present invention does not limit the number of battery cells. For instance, each individual battery cell can be connected in series at each bank by means of the conductive plates 122, 123, 124.

In FIG. 2, B+ and B− represent current terminals, i.e., power source sections provided at either side end of the battery cells connected in series or in a row. Here, B+ is a positive electrode power source section serving as the highest potential terminal, and B− is a negative electrode power source section serving as the lowest potential terminal. A power source terminal tap may be connected to the current terminals to supply power. The conductive plate may be fabricated with a shape of a "T" or "⊥", wherein a horizontal part "—" is a rectangular plate fixed to the positive electrode or the negative electrode by welding, and a vertical part "I" is fixed to the power source terminal tap by soldering. In addition, the conductive plate may be integrally formed with the power source terminal tap.

In addition, B1, B2 and B3 represent sensing terminals, where electrodes of battery cells having different polarities are connected in series. The sensing terminals B1, B2, B3 refer to intermediate potential terminals aligned between the highest potential terminal B+ and the lowest potential terminal B−. A sensing terminal tap may be connected to the sensing terminals B1, B2, B3 to detect voltage. The conductive plate may be fabricated with a shape of a "T" or "⊥", wherein a horizontal part "—" is a rectangular plate fixed to the positive electrode or the negative electrode by welding, and a vertical part "I" is fixed to the sensing terminal tap by soldering. The conductive plate may be integrally formed with the sensing terminal tap.

The power source terminal tap and the sensing terminal tap may be described as "terminal taps". The terminal taps may be fabricated in the form of a wire or an elongated plate and may be made from nickel-containing metal, copper-containing metal, or aluminum-containing metal. However, the present invention is not limited to those materials.

The sensing terminal tap is not shown in FIG. 2. A power terminal tap 131 extending from the conductive plate 121 provided at the B− terminal is connected to a protective circuit of a PCB by passing through the bendable portion of the conductive plate 123 provided at the sensing terminal B2 and along surfaces of battery cells connected to each other in series. In addition, a power terminal tap 132 extending from the conductive plate 125 provided at the B+ terminal is connected to the protective circuit of the PCB. If the battery pack has no PCB, the power source terminal tap 131 may be directly or indirectly connected to an external terminal (not shown) of the battery pack connected to the external electronic device.

Figure 3:
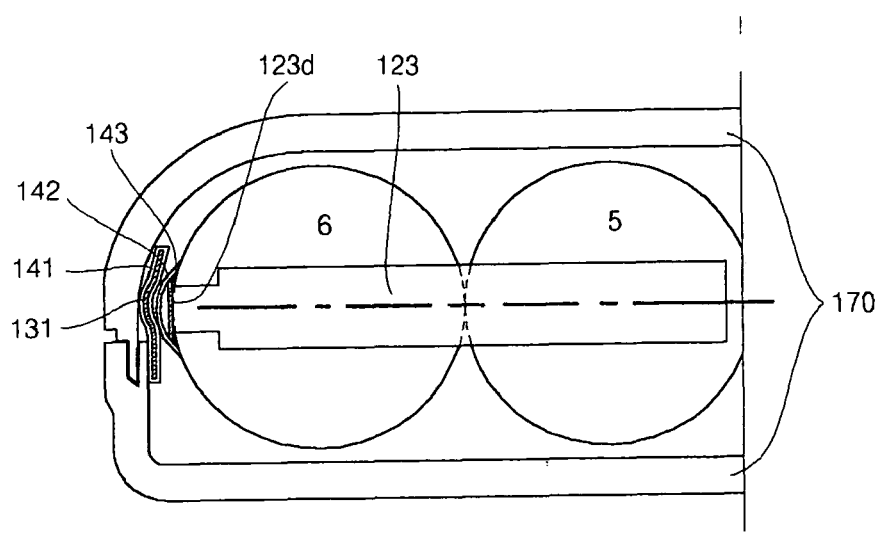
FIG. 3 is a sectional view of a battery pack according to an exemplary embodiment of the present invention.

Referring to FIGS. 2 and 3, the conductive plate 123 connecting the battery cells 5, 6 in parallel is bent adjacent to an outer peripheral portion of the cylinder-type battery cell 6. The bending portion 123d may slightly protrude between the cylinder-type battery cells 4, 6.

To prevent a short circuit from occurring between the bending portion 123d and the power source terminal tap 131 protruding adjacent to the bending portion 123d, an insulating member 142 is attached onto transparent tape 143 used for fixing the battery cells 4, 6. Additionally, the power source terminal tap 31 is surrounded by an insulating member 141.

Figure 4A:
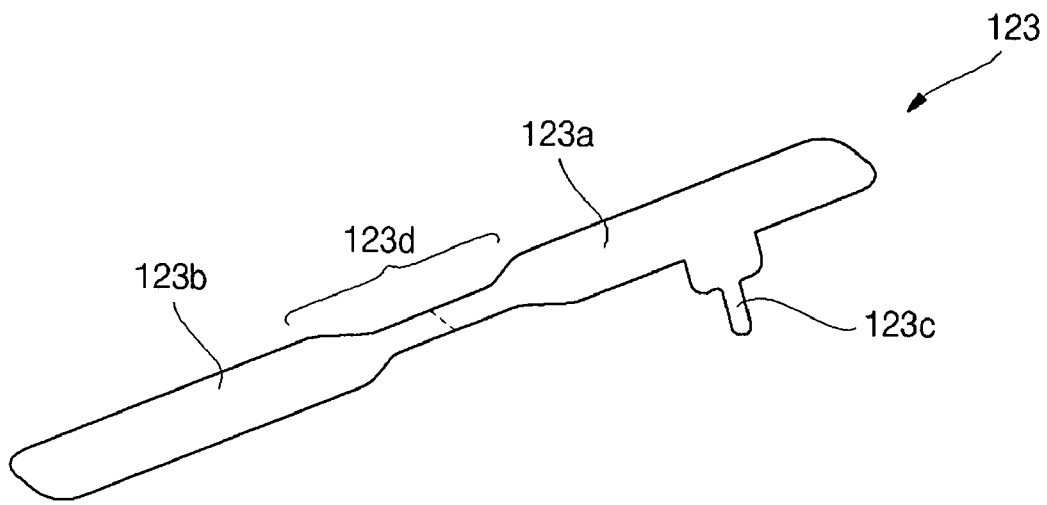
FIGS. 4a, 4b and 4c are perspective views illustrating exemplary conductive plates used in battery packs according to various embodiments of the present invention.

FIG. 4a is a perspective view illustrating an exemplary conductive plate 123 in the elongated state. Referring to FIG. 4a, the conductive plate 123 has an elongated plate shape wherein the bending portion 123d is narrower than the rest of the conductive plate 123.

More specifically, the conductive plate 123 has a substantially rectangular shape having a transverse side longer than a longitudinal side. Recesses are formed on both upper and lower transverse sides at the center portion of the conductive plate 123. The center portion of the conductive plate 123 is a bendable portion 123d. According to another exemplary embodiment of the present invention, at least one rectangular recess can be formed on the upper or lower transverse side at the center portion of the conductive plate 123. The recess may have various shapes so long as the bendable portion 123d is narrower than the rest of the conductive plate 123.

As shown in FIG. 4a, both the upper and lower parts of the bending portion 123d may be recessed. However, only an upper part or a lower part of the bending portion 123d may be recessed.

Still referring to FIG. 4a, the conductive plate 123 has a generally centrally-located bendable portion 123d. In addition, a first-half part 123b of the conductive plate 123 is welded to the top surface of a battery cell having positive polarity and the second-half part 123a of the conductive plate 123 is welded to the bottom surface of a battery cell having negative polarity. The conductive plate 123 may include a terminal tap connection part 123c to which the terminal tap is connected. The terminal tap connection part 123c may be integrally formed with the first-half part 123b or the second-half part 123a of the conductive plate 123.

Figure 1A:
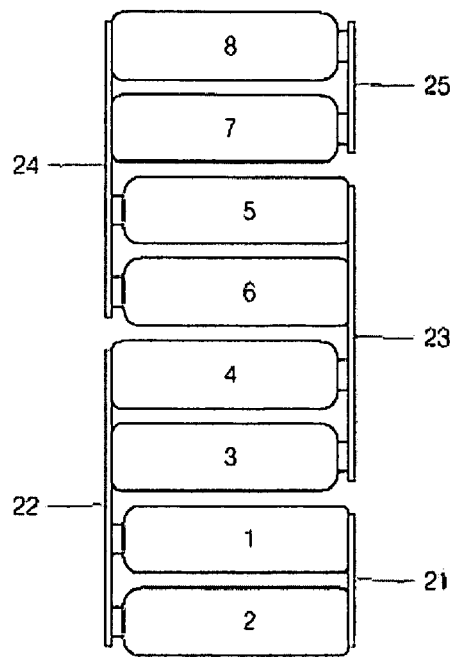
FIG. 1a is a schematic view illustrating battery cells connected by means of conventional conductive plates.
Figure 1B:
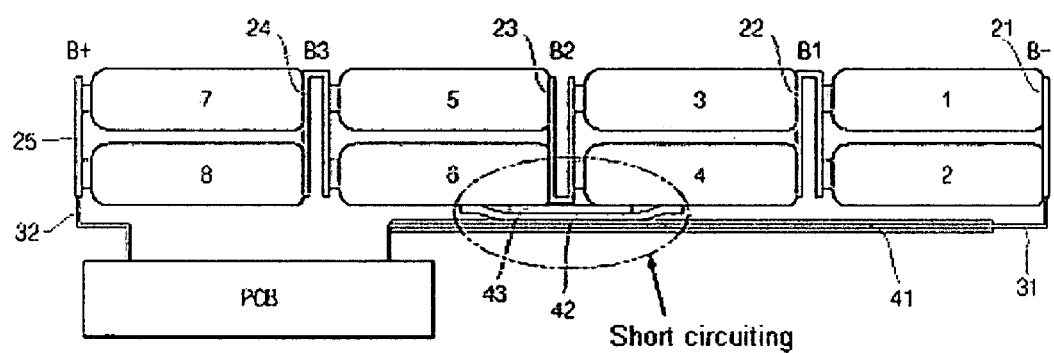
FIG. 1b is a schematic view illustrating the structure of a conventional battery pack.
Figure 1C:
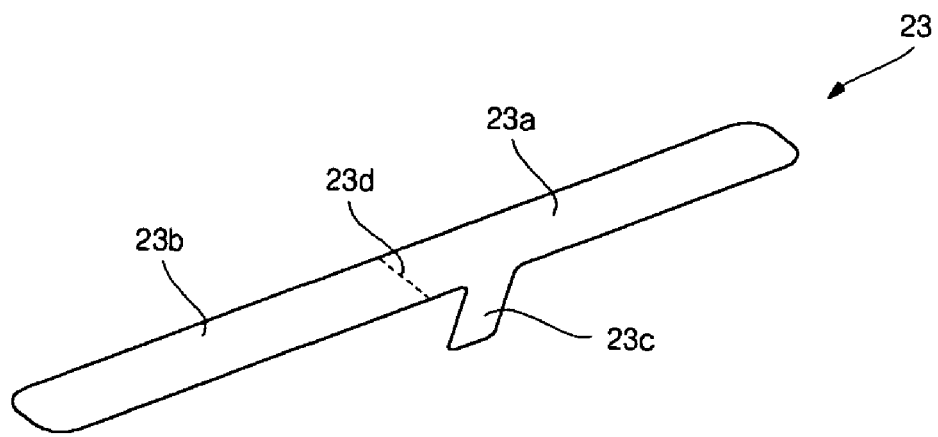
FIG. 1c is a perspective view illustrating a conventional conductive plate used in a battery pack shown in FIG. 1b.
Figure 1D:
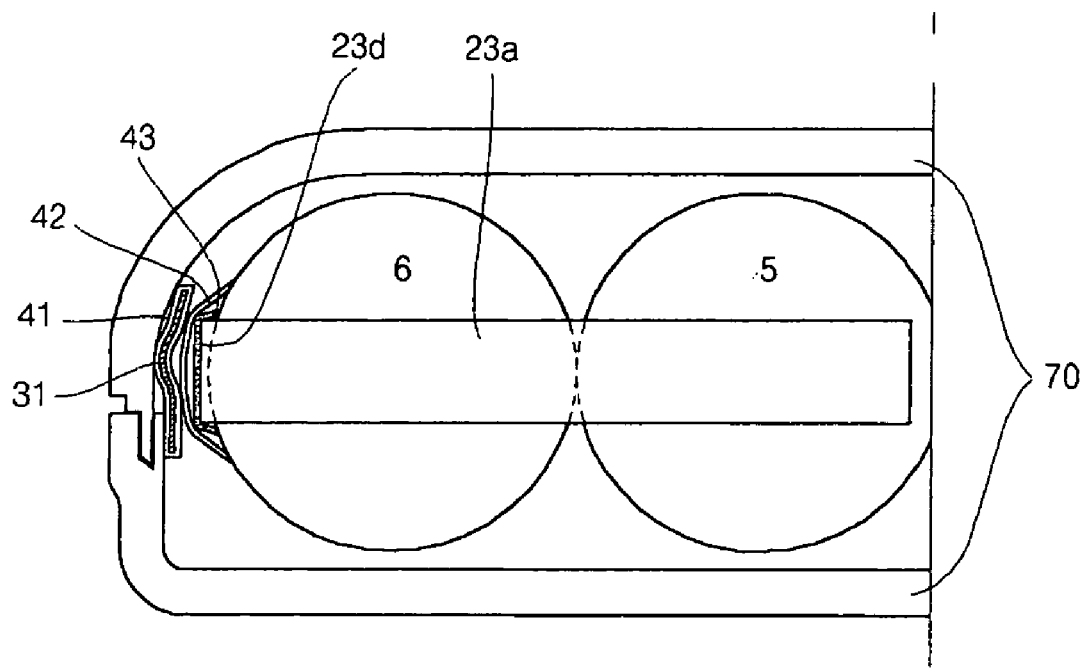
FIG. 1d is a sectional view of a conventional battery pack.

Accordingly, when the conductive plate 123 is bent about the bendable portion 123d, the amount of the bendable portion 123d protruding between the cylinder-type battery cells may be significantly reduced as compared with a conventional conductive plate (see, FIG. 1d). As such, parts of the bendable portion 123d making contact with the power source terminal tap 131 interposed between the insulating members 141, 142 are significantly reduced compared to a conventional bendable portion, thus reducing the likelihood of a short circuit from occurring between the bendable portion 123d and the power source terminal tap 131.

Referring to FIGS. 2, 3 and 4a, the conductive plate 123 has a bent configuration wherein the conductive plate is bent about the bendable portion 123d such that the half portion 123a, 123b are aligned with each other. In an exemplary embodiment, the conductive plate 123 is fixed to the battery cells 5, 6 in such a manner that a bisecting longitudinal line of the conductive plate also bisects both ends of battery cells.

Accordingly, as shown in FIG. 3, the amount of the bendable portion 123d protruding from the cylinder-type battery cell 6 is reduced, thus reducing the likelihood of a short circuit between the bendable portion 123d and the power source terminal tap 131.

In addition, the conductive plate 123 is symmetrically formed about the bendable portion 123d. Also, the conductive plate 123 is symmetrically formed about the line which extends vertically to the bending portion 123d while dividing the bending portion 123d into two equal parts. In this case, the serial connection between the battery cells can be enhanced, and the size of the bending portion protruding out of the battery cells can be minimized.

Although in exemplary embodiments of the present invention the power source terminal tap 131 is fixed to the conductive plate 121 at the lowest potential terminal B− by soldering, the present invention is not limited thereto. For instance, the power source terminal tap may be fixed to the conductive plate at the highest potential terminal B+. Additionally, the terminal tap (not shown) may also be connected to the conductive plate at the intermediate potential terminal B1 passing through the bending portion of the conductive plate provided at the sensing terminal B2.

Figure 4B:
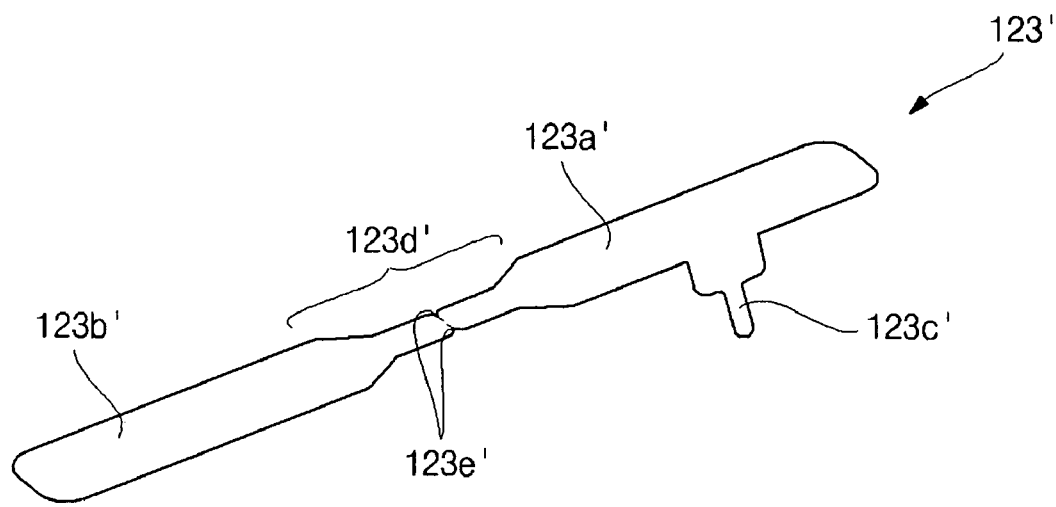

FIG. 4b is a perspective view illustrating another exemplary conductive plate 123' used in a battery pack according to an embodiment of the present invention. The conductive plate 123' has a rectangular plate shape having a transverse side longer than a longitudinal side, in which recesses are formed on upper and lower transverse sides at the center portion of the rectangular plate and slits 123e' are formed at center portions of the recesses. The conductive plate includes a bendable portion 123d' having a slit. The slits allow the bendable portion 123d' to have rounded edges in the bent configuration.

If the conductive plate 123' is applied in the bent configuration to the battery pack shown in FIG. 3, the amount of the bending portion 123d' protruding from the battery cell 6 is significantly reduced so that a contact area between the insulating members 141, 142 and the power source terminal tap 131 is reduced. In addition, since the edges of the bending portion 123d' are rounded when the conductive plate 123' is in the bent configuration, a short circuit is less likely to occur between the bending portion 123d' and the power source terminal tap 131.

Figure 4C:
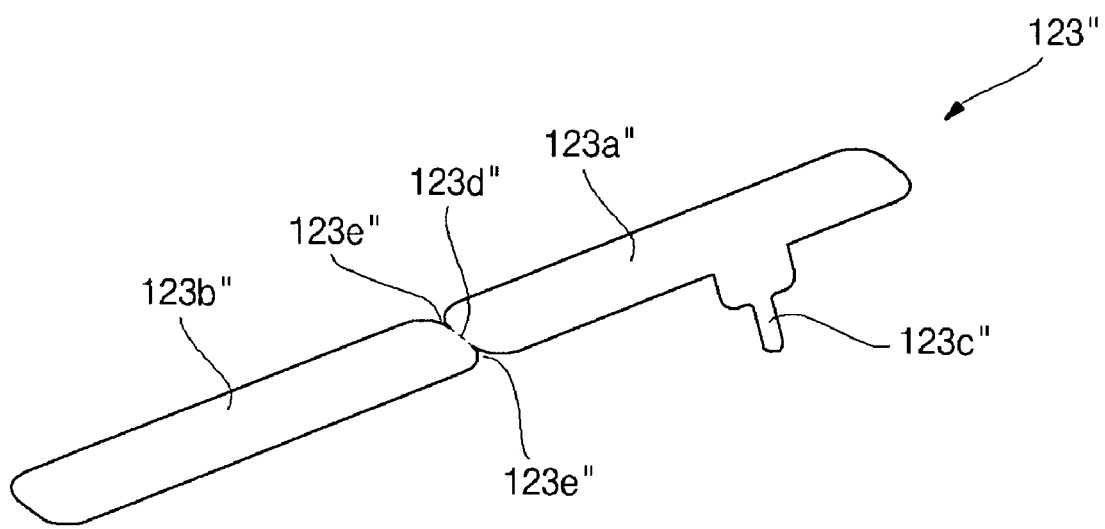

FIG. 4c is a perspective view illustrating an exemplary conductive plate 123" used in a battery pack according to still another embodiment of the present invention. The conductive plate 123" has a rectangular plate shape having a transverse side longer than a longitudinal side, in which slits 123e" are formed on upper and lower transverse sides at the center portion of the rectangular plate. The conductive plate 123" includes a bendable portion 123d" having slits. The slits 123e" allow the bending portion 123d" to have rounded edges in the bent configuration. If the conductive plate 123" is applied in its bent configuration to the battery pack shown in FIG. 3, the amount of the bending portion 123d" protruding out of the battery cell 6 is significantly reduced such that a contact area between the insulating members 141, 142 and the power source terminal tap 131 is reduced. In addition, since the edge parts of the bending portion 123d" are rounded when the conductive plate 123" is in the bent configuration, a short circuit is less likely to occur between the bending portion 123d" and the power source terminal tap 131.

Although bending portions of the conductive plates 122, 124 may also protrude between battery cells at the sensing terminals B1, B3 shown in FIG. 2, since the terminal tap does not extend in the vicinity of the bendable portions of the conductive plates 122, 124, a short circuit is not likely to occur between the terminal tap and the bendable portions.

Therefore, in the battery pack structure as shown in FIG. 2, if the power source terminal tap 131 is shifted toward the battery cells 1, 3, 5, 7, conductive plates 122, 124 provided at the sensing terminals B1, B3 may also include a bendable portion as described above with respect to conductive plate 123.

According to another aspect of the present invention, a battery pack may include a plurality of cylinder-type battery cells, the battery cells including top and bottom surfaces having different polarities; and a conductive plate including a bendable portion, in which a first-half portion of the conductive plate is fixedly connected to the top surface of at least one battery cell, and a second-half portion of the conductive plate is fixedly connected to the bottom surface of at least one other battery cell, so that the conductive plate connects at least two battery cells in series, wherein the conductive plate has an elongated plate shape in an elongate configuration and in which the bendable portion is recessed.

In addition, the battery pack may further include a conductive terminal tap which is electrically connected to one electrode of the cylinder-type battery cell in a vicinity of the bending portion. The conductive plate may be integrally formed with the conductive terminal tap and an edge part of the bendable portion may have a rounded shape when the conductive plate is bent.

Although exemplary embodiments of the present invention have been described for illustrative purposes, those skilled in the art will appreciate that various modifications, additions and substitutions are possible, without departing from the scope and spirit of the invention as disclosed in the accompanying claims. For instance, a width of the bendable portion of a conductive plate may be larger than other parts of the conductive plate as long as the bendable portion is recessed.

What is claimed is:

1. A battery pack comprising:
    a plurality of cylindrical battery cells, each cylindrical battery cell including a first end and a second end having different polarities; and
    an elongated conductive plate including a first half portion, a second half portion, and a bendable portion connecting the first half portion and the second half portion along a first direction,
    wherein the first half portion is fixedly connected to the first end of at least a first cylindrical battery cell of the cylindrical battery cells and the second half portion is fixedly connected to the second end of at least a second cylindrical battery cell of the cylindrical battery cells so that the elongated conductive plate connects at least two cylindrical battery of the cylindrical battery cells in series;
    wherein a width of the bendable portion is narrower than a width of the rest of the conductive plate and narrower than a diameter of at least one of the first and second cylindrical battery cells,
    wherein the conductive plate is in a bent configuration bent about the bendable portion such that the first half portion and the second half portion are aligned,
    wherein the diameter measured along a second direction perpendicular to the first direction has a first diameter end and a second diameter end, and
    wherein the bendable portion is located between the first diameter end and the second diameter end.

2. The battery pack as claimed in claim 1, wherein the conductive plate has a substantially rectangular plate shape having a transverse side longer than a longitudinal side before it is bent, and a recess is formed on at least one of upper and lower transverse sides at a center portion of the rectangular plate.

3. The battery pack as claimed in claim 1, wherein an edge of the bendable portion has a rounded shape.

4. The battery pack as claimed in claim 1, wherein a line bisecting, the first half portion and the second half portion of the conductive plate also bisects an end of at least one cylindrical battery cell.

5. The battery pack as claimed in claim 1, wherein the conductive plate is bent symmetrically about the bendable portion.

6. The battery pack as claimed in claim 1, wherein the conductive plate is bent symmetrically such that the first half portion and the second half portion are aligned.

7. The battery pack as claimed in claim 1, further comprising a conductive terminal tap electrically connected to an electrode of the cylindrical battery cell adjacent the bendable portion.

8. The battery pack as claimed in claim 7, wherein the conductive terminal tap is electrically connected to a lowest potential terminal or a highest potential terminal of the plurality of cylindrical battery cells.

9. The battery pack as claimed in claim 7, wherein the conductive terminal tap is electrically connected to an intermediate potential terminal aligned between a lowest potential terminal and a highest potential terminal of the plurality of cylindrical battery cells.

10. The battery pack as claimed in claim 7, wherein the conductive terminal tap is electrically connected to a protective circuit of a protective circuit module.

11. The battery pack as claimed in claim 7, wherein the conductive plate is integrally formed with the conductive terminal tap.

12. A battery pack comprising:
    a plurality of cylindrical battery cells, each cylindrical battery cell including a first end and a second end having different polarities; and
    an elongated conductive plate including a first half portion, a second half portion, and a bendable portion connecting the first half portion and the second half portion along a first direction,
    wherein the first half portion is fixedly connected to the first end of at least one cylindrical battery cell of the cylindrical battery cells and the second half portion is fixedly connected to the second end of at least one other cylindrical battery cell of the cylindrical battery cells so that the elongated conductive plate connects at least two cylindrical battery cells of the cylindrical battery cells in series,
    wherein at least a part of the bendable portion includes a recessed portion;
    wherein the bendable portion is located inside of a circumference of the first end of the at least one cylindrical battery cell,
    wherein the conductive plate is bent about the bendable portion at the recessed portion such that the first half portion and the second half portion are aligned.

13. The battery pack as claimed in claim 12, wherein an edge of the bendable portion is rounded.

14. The battery pack as claimed in claim 12, wherein the conductive plate is integrally formed with a conductive terminal tap.

15. The battery pack as claimed in claim 12, further comprising a conductive terminal tap electrically connected to an electrode of one cylindrical battery cell adjacent the bendable portion.

16. A conductive plate for a battery pack, the battery pack having a plurality of cylindrical battery cells, each cylindrical battery cell including a first end and a second end having different polarities, the conductive plate comprising a first half portion, a second half portion, and a bendable portion connecting the first half portion and the second half portion in a first direction;
    wherein the first half portion is fixedly connectable to the first end of at least one cylindrical battery cell of the cylindrical battery cells and the second half portion is fixedly connectable to the second end of at least one other cylindrical battery cell of the cylindrical battery cells so that the conductive plate connects at least two cylindrical battery cells of the cylindrical battery cells in series, wherein the conductive plate has an elongated configuration wherein at least a part of the bendable portion includes a recessed portion having a width narrower than a width of the rest of the conductive plate and narrower than a diameter of at least one of the first and second cylindrical battery cells, wherein the conductive plate has a bent configuration where the conductive plate is bent about the bendable portion at the recessed portion such that the first half portion and the second half portion are aligned, wherein the diameter measured along a second direction perpendicular to the first direction has a first diameter end and a second diameter end, and wherein the recessed portion is located between the first diameter end and the second diameter end.

* * * * *

UNITED STATES PATENT AND TRADEMARK OFFICE
CERTIFICATE OF CORRECTION

| | | |
|---|---|---|
| PATENT NO. | : 7,771,868 B2 | Page 1 of 1 |
| APPLICATION NO. | : 11/591999 | |
| DATED | : August 10, 2010 | |
| INVENTOR(S) | : Paul Kim | |

It is certified that error appears in the above-identified patent and that said Letters Patent is hereby corrected as shown below:

In the Claims

| | |
|---|---|
| Column 7, Claim 1, line 37 | Before "of" Insert -- cells -- |
| Column 7, Claim 1, line 40 | Delete "series;" Insert -- series, -- |
| Column 7, Claim 4, line 62 | After "bisecting" Delete "," |

Signed and Sealed this
Eighth Day of November, 2011

David J. Kappos
*Director of the United States Patent and Trademark Office*

UNITED STATES PATENT AND TRADEMARK OFFICE
CERTIFICATE OF CORRECTION

PATENT NO. : 7,771,868 B2  Page 1 of 1
APPLICATION NO. : 11/591999
DATED : August 10, 2010
INVENTOR(S) : Paul Kim It is certified that error appears in the above-identified patent and that said Letters Patent is hereby corrected as shown below:

In the Claims

| | |
|---|---|
| Column 7, Claim 1, line 39 | Before "of" Insert -- cells -- |
| Column 7, Claim 1, line 40 | Delete "series;" Insert -- series, -- |
| Column 7, Claim 4, line 62 | After "bisecting" Delete "," |

This certificate supersedes the Certificate of Correction issued November 8, 2011.

Signed and Sealed this
Fifteenth Day of May, 2012

David J. Kappos
*Director of the United States Patent and Trademark Office*